United States Patent [19]

Zebuhr

[11] 4,263,894

[45] Apr. 28, 1981

[54] AIR STORING AND TRANSMITTING SYSTEM

[75] Inventor: William H. Zebuhr, Nashua, N.H.

[73] Assignee: Sunhouse, Incorporated, Nashua, N.H.

[21] Appl. No.: 933,276

[22] Filed: Aug. 14, 1978

[51] Int. Cl.³ ............................................. F27J 3/02
[52] U.S. Cl. ................................. 126/430; 126/438; 165/48 S
[58] Field of Search ............... 126/270, 271, 439, 429, 126/428, 441, 437, 430, 438; 237/1 A; 165/104 S, 48 S; 98/33 A, 40 D, DIG. 6, 42 A

[56] References Cited

U.S. PATENT DOCUMENTS

| | | | |
|---|---|---|---|
| 1,652,347 | 12/1927 | Champeau | 98/40 D |
| 2,428,876 | 10/1947 | Hawkins | 126/270 |
| 3,841,302 | 10/1974 | Falbel | 126/270 |
| 3,902,474 | 9/1975 | Pyle | 126/270 |
| 3,952,947 | 4/1976 | Saunders | 165/104 S X |
| 4,004,574 | 1/1977 | Barr | 165/104 S X |
| 4,011,736 | 3/1977 | Harrison | 165/104 S X |
| 4,049,195 | 9/1977 | Rugenstein | 126/270 X |
| 4,051,999 | 4/1977 | Granger et al. | 237/1 A |
| 4,062,346 | 12/1977 | Rapp, Jr. et al. | 126/430 |
| 4,103,825 | 8/1978 | Zornig | 126/270 X |
| 4,121,764 | 11/1978 | Hope et al. | 126/429 |
| 4,141,498 | 2/1979 | Marschner | 126/437 |

Primary Examiner—Albert J. Makay
Assistant Examiner—Henry Bennett
Attorney, Agent, or Firm—Albert Gordon

[57] ABSTRACT

A system for storing heated air in the attic of a building by solar energy and for transmitting the heated air to a heat exchanger. The attic includes a floor, a roof formed of two oppositely inclined portions that meet at a peak, one of the inclined portions being glazed to form a light pervious surface and the other inclined portion being light impervious. The attic floor beneath the light pervious roof portion is covered with a light reflective surface. Located in the attic beneath the light impervious roof portion is an entrance end of an inlet duct leading from the attic to a heat exchanger and an exit end of an outlet duct leading from the heat exchanger to the attic. A blower is provided to blow air from the attic through the inlet duct, the heat exchanger, and the outlet duct back to the attic.

11 Claims, 4 Drawing Figures

AIR STORING AND TRANSMITTING SYSTEM

BACKGROUND AND SUMMARY OF THE INVENTION

This invention is concerned with the storage and transmittal of fluid to a heat transfer station. The transmitted fluid coacts with the heat transfer station to perform useful work. In accordance with this invention, the fluid is air that is stored in an enclosure (herein disclosed as a building attic) and is heated by sun rays passing through a light pervious portion of the roof of the enclosure. A light reflective surface may be so positioned on the floor of the enclosure as to reflect the sun rays into a portion of the enclosure that has a roof that is light impervious where the solar heated air is stored and from which it is transmitted, as needed, to the heat transfer station. This invention thereby provides an effective and economical system, utilizing solar energy, for effecting the transmittal of conditioned fluid to the heat transfer station.

DESCRIPTION OF THE PREFERRED EMBODIMENTS

Figure 1:
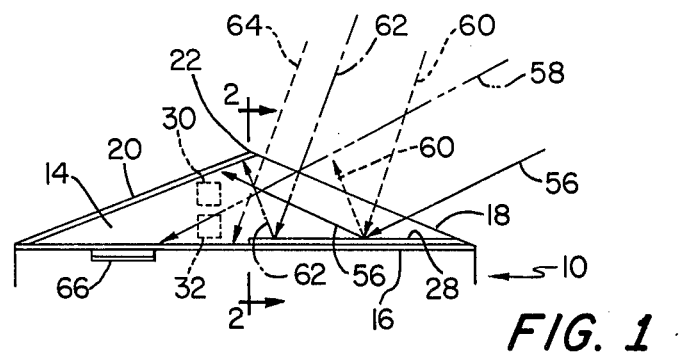
FIG. 1 is a section of the upper portion of a building incorporating this invention.
Figure 2:
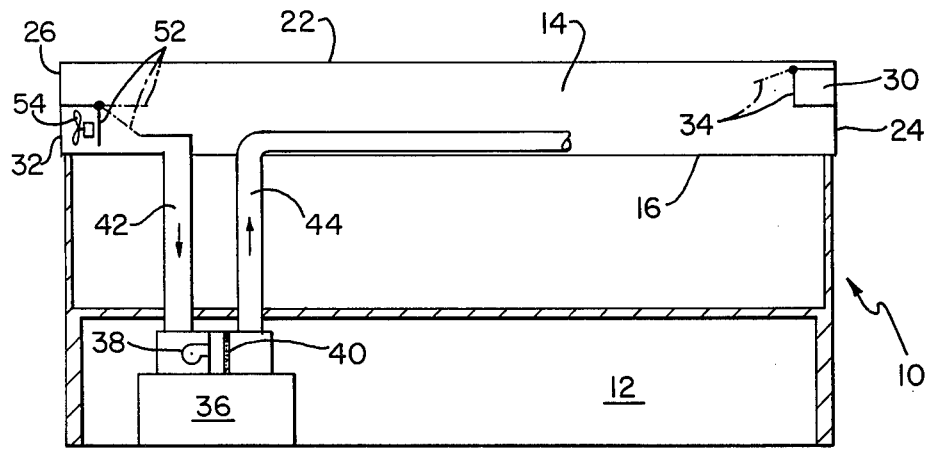
FIG. 2 is a section taken along the line 2—2 of FIG. 1.

Referring to FIGS. 1 and 2, a building 10 has living space 12 therein and an attic 14 above the living space. The attic has a floor 16 and two oppositely inclined roof portions 18 and 20 that meet at a peak 22. The roof portion 18 faces the sunny side of the house (south in the northern hemisphere) and the roof portion 20 faces the shady side of the house (north in the northern hemisphere). The roof portion 18 is made of a transparent or translucent glazing so as to be light pervious and permit sunlight to pass therethrough and the roof portion 20 is insulated and impervious to the passage of sunlight therethrough. The attic 14 at the opposite ends of the roof portions 18 and 20 are formed into triangular walls 24 and 26. The portion of the attic floor 16 that is beneath the light pervious roof portion 18 is covered with a reflective surface 28 which may be the foil backing of insulation covering this portion of the attic floor. The remainder of the attic floor 16 is not covered with a reflective surface.

A conduit 30 is provided in the wall 24 at a relatively high level and a conduit 32 is provided in the wall 26 at a relatively low level. Both of the conduits 30 and 32 are located beneath the roof portion 20 on the shady side of the house 10. A damper 34 is so mounted to the conduit 30 as to be movable between the closed solid line position of FIG. 2 where it closes the conduit 30 and precludes the passage of air through the conduit 30 and the open phantom position of FIG. 2 where it permits the passage of air through the conduit 30.

A tank 36 is located in the building 10 below the attic 14. A blower 38 and a heat exchanger 40 are mounted to the top of the tank 36. An inlet duct 42 extends from the attic 14 to the blower 38 and an outlet duct 44 extends from the heat exchanger 40 back to the attic 14. The blower 38, the heat exchanger 40 and the ducts 42 and 44 are so constructed that operation of the blower 38 causes air to flow from the attic 14 through the duct 42, past the blower 38 and the heat exchanger 40, and through the duct 44 back to the attic 14.

Figure 3:
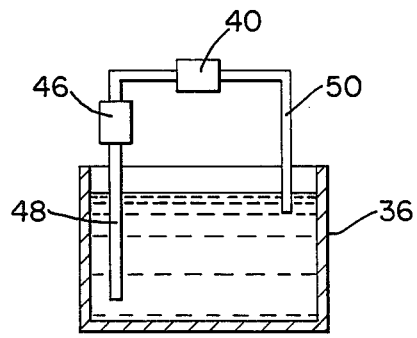
FIG. 3 is schematic representation of a tank of water whose temperature is modified at the heat transfer station.

Referring to FIG. 3, the tank 36 is adapted to contain a quantity of water. A pump 46 is actuable to force water from the tank 36 through a pipe 48, the heat exchanger 40 and a pipe 50 back to the tank 36. The heat exchanger 40 is associated by mechanism shown in U.S. patent application Ser. No. 864,324 filed Dec. 27, 1977 to ductwork leading into the living space 12 so as to enable a heat transfer to take place between the water flowing through the heat exchanger 40 and the ductwork to modify the temperature of air flowing through the ductwork and thereby modify the temperature of the living space 12.

A damper 52 is so mounted to the conduit 32 as to be movable between the lower solid line position of FIG. 2 wherein it closes the conduit 32 and precludes flow of air through the conduit 32, the intermediate phantom position of FIG. 2 wherein air passing through the conduit 32 is caused to flow into the inlet duct 42 and not flow into the attic 14, and the upper phantom position of FIG. 2 wherein air passing through the conduit 32 can flow into the attic 14. A fan 54 in the conduit 32 is actuable to blow air from the ambient through the conduit 32 into the attic 14.

In the winter, the air transmittal arrangement shown in FIGS. 1 and 2 is used to transmit warm air to the heat exchanger 40 so that water flowing through the heat exchanger 40 by way of the pipes 48 and 50 may have heat transferred thereto from the warm air flowing through the heat exchanger 40. The water in the tank 36 is thus heated and this heated water is utilized to heat the living space 12 of the building 10 in the manner disclosed in U.S. patent application Ser. No. 864,324 filed Dec. 27, 1977. In the water, the sun rays enter and pass through the pervious roof portion 18 at a relatively small angle with respect to the horizontal as indicated by the lines 56 and 58 in FIG. 1. The sun rays passing through the parts of the roof portion 18 closer to its lowermost portion near the side wall of the building 10 will be reflected from the reflective surface 28 into the attic portion that is below the light impervious roof portion 20. The sun rays passing through the parts of the roof portion 18 closest to the peak 22 will pass directly into the attic portion that is below the light impervious roof portion 20. At this time the dampers 34 and 52 are in their solid line closed positions. It is noted that the conduits 30 and 32, the dampers 34 and 52, the entrance end of the duct 42 in the attic 14, and the exit end of the duct 44 in the attic 14 are beneath the light impervious roof portion 20. The operation of the blower 38 causes the solar heated air in the attic 14, which has been heated by the sun rays passing through the light pervious roof portion 18, to flow from the attic 14 through the duct 42, the blower 38, the heat exchanger 40, and the duct 44 back to the attic 14. The entrance end of the duct 42 is close to a first end of the attic 14 next to the wall 26 and the exit end of the duct 44 faces the second end of the attic 14 next to the wall 24. Therefore the air exiting from duct 44 will travel to the second end of the attic by momentum before traveling to the first end of the attic and then into the duct 42.

Due to the entrance end of the duct 42 and the exit end of the duct 44 being beneath the light impervious roof portion 20, the air flowing through the attic will travel mainly beneath the light impervious roof portion 20 and thus avoid the heat loss in the air through the glazing of the light pervious roof portion 18 that would occur by virtue of the air passing past this glazing.

In the summer, the air transmittal arrangement comprised of the ducts 42 and 44, the blower 38, and the heat exchanger 40 are not utilized to heat the living space 12 or are not used to as great an extent as in the winter. Also, in the summer it is desireous to not overheat the attic 14. The solar heat collector formed by the attic 14, the roof portions 18 and 20, and the reflective attic floor surface 28 is less efficient in the summer, for the reasons set forth in the following paragraph, and thereby avoids excessive heat build up in the attic 14.

In the summer, the sun rays will enter the attic 14 through the roof portion 18 at a much larger angle to the horizontal, as indicated by the lines 60, 62, and 64, than in the winter. The rays along the line 60 will be reflected by the reflective surface 28 back to ambient through the roof portion 18, the rays along the line 62 will be reflected by the reflective surface 28 into the part of the attic beneath the light impervious roof portion 20, and the rays along the line 64 will directly enter the part of the attic beneath the light impervious roof portion 20. Thus, it can be seen that in the summer a smaller proportion of the sun rays will stay in the attic 14 than in the winter. Despite this, however, the attic 14 tends to become overly hot in the summer without ventilation and, to avoid this, the attic ventilating arrangement described in the following paragraph is brought into play when there is no need to heat the water in the tank 36 for the purpose of heating the living space 12.

In the ventilating arrangement, the dampers 34 and 52 are in their upper phantom positions. This allows air to pass from the ambient into the attic 14 through the conduit 32, then through the attic, and finally out of the attic through the conduit 30. The air will usually flow in this direction through the attic because, as indicated in FIGS. 1 and 2, and as stated above, the conduit 30 is at a higher level than the conduit 32 and the air once in the attic will warm and therefore rise. The wind could, under certain circumstances, cause air flow through the attic from the conduit 30 to the conduit 32. When this natural air circulation is not adequate to ventilate the attic in the warmest days of intense sunshine, the fan 54 can be activated to force air flow through the attic 14 from the conduit 32 to the conduit 30. The fan 54 can be turned on with a thermostat or a simple thermal activator. The dampers 34 and 52 may automatically be opened to permit attic ventilation by a thermal activator such as a bimetalic device or a wax expansion device commonly used in automotive thermostats to ensure the prevention of excessive heat build up in the attic 14 even in the event of a power failure of the building electrical service. A fan similar to the fan 54 may be placed in the conduit 30 alternatively or additionally to the fan 54 in the conduit 30 for attic ventilation.

In the summer, the air transmittal arrangement is used to transmit relatively cool ambient air to the heat exchanger 40 so that water flowing through the heat exchanger 40 by way of the pipes 48 and 50 may have heat transferred away therefrom to the cool air flowing through the heat exchanger 40. The water in the tank 36 is thus cooled and this cooled water is utilized to cool the living space 12 of the building 10 in the manner disclosed in U.S. patent application Ser. No. 864,324 filed Dec. 27, 1977. To effect this transmittal of cool ambient air, the damper 34 is placed in its upper phantom position, the damper 52 is placed in its intermediate phantom position, and the blower 38 is turned on. The operation of the blower 38 causes ambient air to flow through the conduit 32, the duct 42, the blower 38, the heat exchanger 40 and duct 44 and then into the attic 14. From the attic 14, this air flows back to the ambient through the conduit 30.

Aside from enabling a heat exchange to take place for the purpose of heating or cooling the living space 12, this invention provides passive heat retention and heat rejection benefits for the building 10. In the winter, when the sun is low in the sky, the sun rays 56 and 58 will flood virtually the entire attic floor 16 with solar energy which will maintain the attic temperature such as to minimize heat loss from the living space 12 into the attic 14. In the summer, when the sun is high in the sky, the sun rays 60, are reflected back into the ambient to cut down on undesirable heat gain in the attic 14.

Referring to FIG. 1, a skylight 66 of light pervious material such as transparent glass is formed in the attic floor 16 beneath the light impervious roof portion 20. During the winter, sun rays traveling along the line 58 will impinge on the skylight 66 to thus provide passive heat and light to the shady side of the building in the winter. During the summer, none of the sun rays will impinge directly on the skylight 66 so there will be no passive heat added to the building at this time although there will be an indirect accretion of light to the building at this time.

Figure 4:
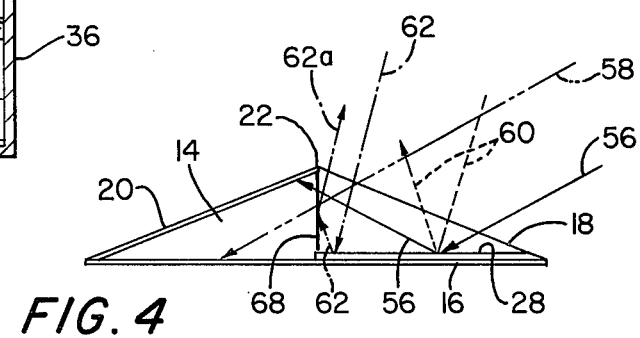
FIG. 4 is a view similar to FIG. 1 showing a modification of the system for storing heated air in the attic of the building.

As shown in FIG. 4, a light pervious curtain 68 made of a translucent or transparent material may depend from the roof peak 22 into the attic 14 and separate the parts of the attic that are beneath the light pervious roof portion 18 and the light impervious roof portion 20. Therefore, the low winter sun rays traveling along the lines 56 and 58, which intersect the curtain 68 at a relatively large angle closer to 90 degrees than 0 degrees can pass through the curtain and be trapped in the part of the attic beneath the light impervious roof portion 20 where the heated air flowing from the exit end of the duct 44 to the entrance end of the duct 42 as a result of the operation of the blower 38. The curtain 68, however, will retrain this heated air from passing into the part of the attic beneath the glazed and light pervious roof portion 18 and thus inhibit heat loss through the glazing.

With the curtain 68 in place as shown in FIG. 4, the summer sun rays along the line 62, which wihtout the curtain are reflected into the part of the attic beneath the light impervious roof portion 20, are reflected by the curtain 68 along the line 62a back through the light pervious roof portion 18 and into the ambient. This is because the rays along the line 62 intersect the curtain 68 at a relatively small angle that is less than 45 degrees. Thus, in the summer time, the curtain 68 inhibits an undesired accumulation of heat in the attic 14.

I claim:

1. An air storing and transmitting system comprising: an enclosure having a floor and a roof, the roof having two oppositely inclined portions that meet at a peak, one of the inclined portions that faces the sunny side of the enclosure being light pervious and the other inclined portion being light impervious, said light impervious portion having an outer surface facing the ambient and an inner surface facing the enclosure floor; a light reflective surface positioned on the floor beneath the light pervious roof portion such that the sun rays passing through the light pervious roof portion are reflected off of the light reflective surface through the light pervious roof portion when the sun is relatively high in the sky and with a greater portion of the sun rays being reflected off of the light reflective surface and against the inner surface of the light impervious portion when the sun is relatively low in the sky whereby the sun rays are collected within the enclosure; a heat transfer station; and air transmitting means for transmitting air from the enclosure to the heat transfer station.

2. The system of claim 1 further comprising: a tank adapted to contain water; wherein said heat transfer station comprises: a heat exchanger; further comprising: means for forcing water from the tank through the heat exchanger and back to the tank; and wherein said air transmitting means comprises: means for forcing air from the enclosure through the heat exchanger and back to the enclosure.

3. The system of claim 1 wherein said enclosure comprises walls; wherein said air transmitting means is so constructed and arranged as to be actuable to transmit air from the enclosure through the heat transfer station and back to the enclosure: and further comprising: a pair of spaced conduits in the walls providing access to the enclosure from the ambient; and a damper associated with each conduit movable between an open position wherein air may pass through its associated conduit and a closed position wherein passage of air through its associtated conduit is blocked.

4. An air storing and transmitting system comprising: an enclosure having a roof, a floor, and walls, the roof comprising two oppositely inclined portions that meet at a peak, one of the inclined portions that faces the sunny side of the enclosure being light pervious and the other inclined portion being light impervious, said light impervious portion having an outer surface facing the ambient and an inner surface facing the enclosure floor; a light reflective surface positioned on the floor beneath said light pervious roof portion such that the sun rays passing through the light pervious roof portion are reflected off of the light reflective surface through the light pervious roof portion back into the ambient when the sun is relatively high in the sky and with a greater portion of the sun rays being reflected off of the light reflective surface and against the inner surface of the light impervious portion when the sun is relatively low in the sky whereby the sun rays are collected within the enclosure; a heat transfer station; air transmitting means actuable to transmit air from the enclosure through the heat transfer station and back to the enclosure; a pair of spaced conduits in the walls providing access to the enclosure from the ambient; and a damper associated with each conduit movable between an open position wherein air may pass through its associated conduit and a closed position wherein passage of air through its associated conduit is blocked.

5. The system of claim 4 further comprising: a tank adapted to contain water; wherein said heat transfer station comprises: a heat exchanger; further comprising: means for forcing water from the tank through the heat exchanger and back to the tank; and wherein said air transmitting means comprises: an inlet duct extending from the enclosure to the heat exchanger; an outlet duct extending from the heat exchanger to the enclosure; and a blower so constructed and arranged as to be actuable to transmit air from the enclosure through the inlet duct, the heat exchanger, and the outlet duct back to the enclosure.

6. An air storing and transmitting system comprising: an enclosure having a floor; a roof formed of two oppositely inclined portions that meet at a peak, one of the inclined portions that faces the sunny side of the enclosure being light pervious and the other inclined portion being light impervious, said light impervious portion having an outer surface facing the ambient and an inner surface facing the enclosure floor; a wall extending from each end of the roof to the floor; a light reflective surface positioned on the floor beneath the light pervious roof portion such that the sun rays passing through the light pervious roof portion are reflected off of the light reflective surface through the light pervious roof portion back into the ambient when the sun is relatively high in the sky and with a greater portion of the sun rays being reflected off of the light reflective surface and against the inner surface of the light impervious portion when the sun is relatively low in the sky whereby the sun rays are collected within the enclosure; a heat transfer station; an inlet duct, having an entrance end in the enclosure beneath the light impervious roof portion, extending between the enclosure and the heat transfer station; an outlet duct, having an exit end in the enclosure beneath the light impervious roof portion, extending between the heat transfer station and the enclosure; and means actuable to transmit air from the enclosure, through the inlet duct, the heat transfer station and the outlet duct back to the enclosure.

7. The system of claim 6 further comprising: a conduit in each of said walls beneath the light impervious roof portion, the conduits providing access to the enclosure from the ambient; and a damper associated with each conduit movable between an open position wherein air may pass through its associated conduit and a closed position wherein passage of air through its associated conduit is blocked.

8. An air storing and transmitting system comprising: an enclosure having a roof comprising two oppositely inclined portions that meet at a peak, with one of the inclined portions being light pervious and the other inclined portion being light impervious, a floor, and first and second spaced walls that extend from each end of the floor to the roof; a light reflective surface on a portion of the floor that is beneath said light pervious roof portion adapted to reflect sun rays passing through the light pervious roof portion so that heated air is collected in the enclosure; spaced first and second conduits respectively located in the first and second walls beneath the light impervious roof portion providing access to the enclosure from the ambient; a heat transfer station; an inlet duct, having an entrance end in the enclosure beneath the light impervious roof portion, extending from the enclosure to the heat transfer station; an outlet duct, having an exit end in the enclosure beneath the light impervious roof portion, extending from the heat transfer station to the enclosure; a blower so constructed and arranged as to be actuable to transmit air from the enclosure through the inlet duct, the heat transfer station, and the outlet duct back to the enclosure; a first damper so constructed and arranged and so mounted in the first conduit as to be movable between a position wherein air passing through the first conduit from the ambient flows into the enclosure, a second position wherein air passing through the first conduit from the ambient flows into the inlet duct, and a third position wherein passage of air through the first conduit is blocked; and a second damper so constructed and arranged and so mounted to the second conduit as to be movable between an open position wherein air may pass through the second conduit and a closed position wherein passage of air through the second conduit is blocked.

9. The system of claim 1, claim 4, claim 6, or claim 8 further comprising: a light pervious curtain depending from the roof peak in such a manner as to separate the light pervious roof portion and the light impervious roof portion.

10. The system of claim 1, claim 4, claim 6 or claim 8 wherein the enclosure forms the attic portion of a building and further comprising: a skylight between the attic and the portion of the building beneath the attic formed in the attic floor beneath the light impervious roof portion.

11. The system of claim 3, claim 4, claim 7, or claim 8 further comprising a fan located in at least one of said conduits actuable to blow air through its associated conduit when the conduit dampers permit passage of air between the ambient and the enclosure.

* * * * *